United States Patent [19]

Herbener et al.

[11] 4,143,860

[45] Mar. 13, 1979

[54] FLAME CUTTING MACHINE FOR CONTINUOUS CASTING STRAND AND THE LIKE

[75] Inventors: Klaus Herbener, Bruchkobel; Ewald Schmitt, Maintal, both of Fed. Rep. of Germany

[73] Assignee: Messer Griesheim GmbH, Frankfurt am Main, Fed. Rep. of Germany

[21] Appl. No.: 823,615

[22] Filed: Aug. 11, 1977

[30] Foreign Application Priority Data

Sep. 2, 1976 [DE] Fed. Rep. of Germany ....... 2639437

[51] Int. Cl.[2] .............................................. B23K 37/00

[52] U.S. Cl. .......................................... 266/49; 266/50

[58] Field of Search ........................ 266/48, 49, 50, 65

[56] References Cited

U.S. PATENT DOCUMENTS

| | | | |
|---|---|---|---|
| 2,380,188 | 7/1945 | O'Connor | 266/49 X |
| 2,685,442 | 8/1954 | Cloughessy | 266/49 X |
| 3,539,168 | 11/1970 | Pfeuffer | 266/50 |
| 4,058,299 | 11/1977 | Linkuist | 266/48 |
| 4,063,059 | 12/1977 | Brolund et al. | 266/48 X |

*Primary Examiner*—Roy Lake
*Assistant Examiner*—Paul A. Bell
*Attorney, Agent, or Firm*—Connolly and Hutz

[57] ABSTRACT

A flame cutting machine for subdividing continuously prepared poured casting strands or the like includes an essentially closed suction head in the cutting zone which is mounted movable together with the flame cutting machine for removal of smoke gases, slag and the like produced during the cutting process.

9 Claims, 5 Drawing Figures

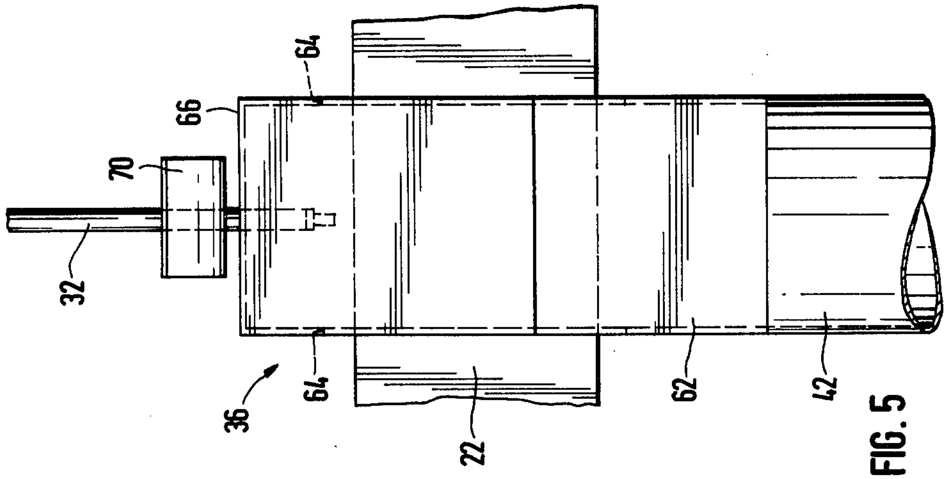
FIG. 5
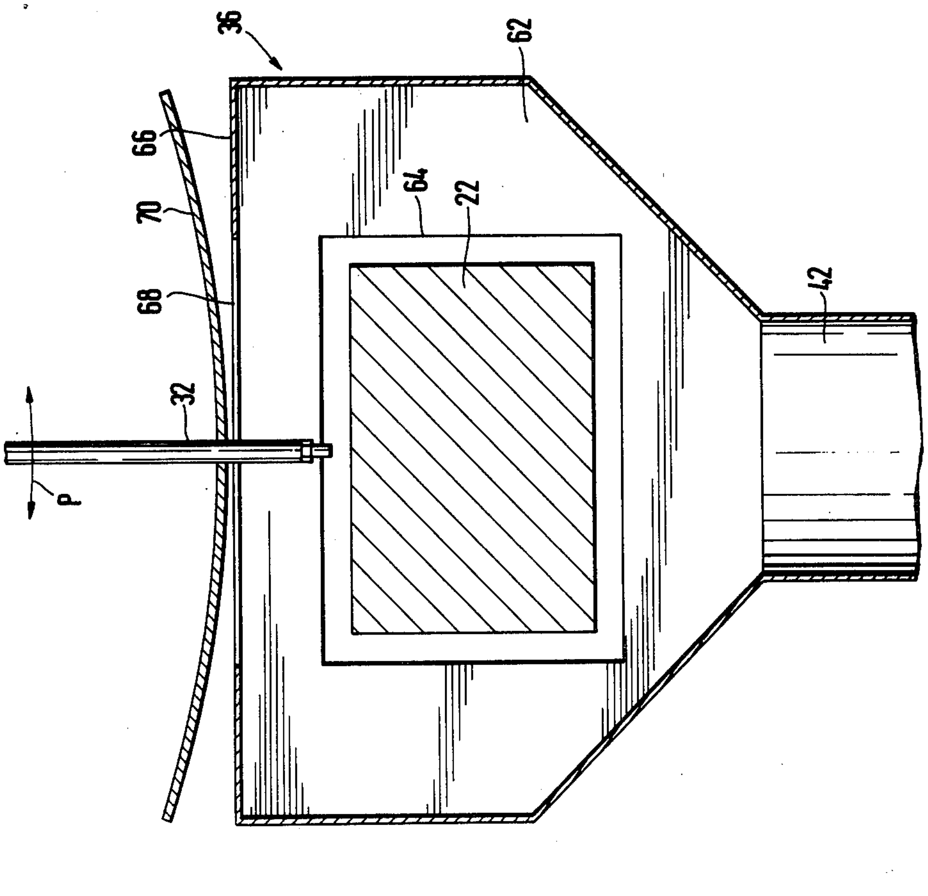

FLAME CUTTING MACHINE FOR CONTINUOUS CASTING STRAND AND THE LIKE

BACKGROUND OF THE INVENTION

The invention is concerned with a casting strand or rope flame cutting machine for subdividing continuously prepared poured casting strands with a device for removing smoke gases, slag and the like produced during the cutting process.

When flame cutting steel, especially alloyed steel, considerable amounts of smoke gases result which must be removed from the flame cutting machine before they spread into the environment in a manner which is harmful to health. The slag which is likewise produced also must be captured and channeled away.

There is an arrangement which is already known for solving this problem (German Patent DT-AS No. 1,508,909), according to which a collecting space is provided underneath the track of the casting strands flame cutting machine where slag produced when the cross section is made, accumulates and is then removed. The smoke which further accumulates in this collecting space is removed with a suction device. Since this collecting space is relatively large in accordance with the traverse path of the flame cutting machine, the space is bounded above in hood fashion by dampers and lateral sheet metal plates.

SUMMARY OF THE INVENTION

An object of the invention is to coordinate to such a flame cutting machine a device with which an optimal removal of smoke gases, slag and the like can be achieved.

In accordance with the invention in the cutting zone of the casting strand to be cross sectioned an essentially closed head is mounted which is movable together with the flame cutting machine. As a result of the direct mounting of the suction hood in the area of the cutting torch, the smoke gases, slag and the like are taken up immediately when the cross cut is made, without, especially in the cases of smoke gases, an unwanted escape into the environment.

According to a preferred construction of the invention, it is provided that the suction hood consist of a protective bell shaped element mounted above the casting strands and surrounding the cutting torch — as well as a suction funnel mounted beneath the cutting zone.

According to an additional feature of the invention, the suction hood is advantageously designed as a housing which surrounds the casting strands. This variant is particularly useful with casting strands which have a smaller cross sectioned area whereby the protective hood and the suction funnel are, according to the invention, joined together to make on unit.

In order to be able to accumulate the slag produced during cutting in a definite location it is proposed that an outlet duct be hooked up to the suction hood, the free end of the outlet duct ending in a settling tank. The cutting slag falls through this line into the settling tank filled with water, cools off there and accumulates at the bottom, in order to then be removed at regular intervals.

In order to be able to remove the smoke gases which are likewise taken up by the suction hood, a branch duct, in which a ventilator and a filter at the free end are provided, is hooked up to the outlet duct. Since, however, the suction device is movable together with the continuous strand flame cutting machine, a telescoping connecting piece is installed, according to the invention, in the branch duct. This connecting piece connects, in advantageous fashion, the movable part of the branch duct to the fixed part.

According to the invention, it is furthermore provided that suction hood which surrounds the continuous strand exhibits a transverse slit in its top side. The housing-like suction hood is thereby completely closed except for both passage apertures, for the casting strand and for the relatively smaller transverse slits, so that the forming smoke gases as well as the slag produced can be channeled, practically without loss into the outlet line.

In order to prevent the slag particles from possible spraying away in an upward direction, a plate which covers the transverse slit in the housing is attached to the cutting torch.

With the invention's suction arrangement, an optimal removal of smoke gases, slag and the like is assured since these are for all intensive purposes immediately taken up and channeled away. As a result of the essentially complete encapsulation of the cutting torch, especially the preheating flames and the cutting oxygen jet, the noises — most of all with so called high powered cutting torches — resulting from the cutting are dampened by a considerable amount. The suction device also works as noise protection.

THE DRAWINGS

FIG. 4 is a cross-sectional view of the suction hood in an additional form of the invention; and FIG. 5 is a side view of the hood shown in FIG. 4.

DETAILED DESCRIPTION

Figure 1:
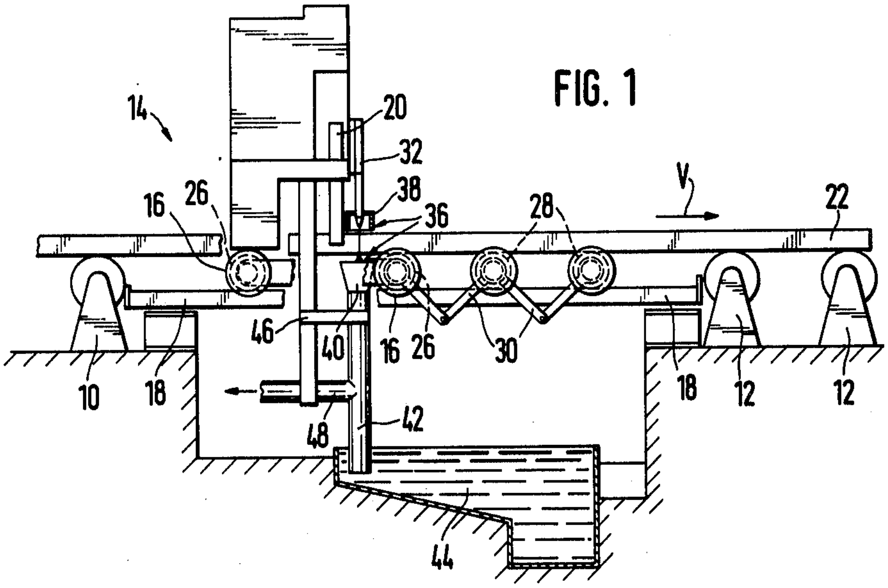
FIG. 1 is a side view of a flame cutting machine in accordance with the invention.

A movable casting strand flame cutting machine 14 is illustrated (FIG. 1) between a feed roller and a discharge roller, 10 and 12 respectively. This machine moves by means of its tread rollers 16 and guide rails 18 which stretch between both of the roller conveyors 10 and 12.

The flame cutting machine 14 is of a known construction and includes a clamping device 20, by means of which the machine is clamped onto the moving casting strand 22 and is moved by it.

The casting strands 22 moved along by the roller conveyors 10, 12 lies on the support rollers 26, 28 within the traverse path 24 of the flame cutting machine 14 outlined by the guide rails 18. The support rollers 26 are thus, as shown in FIG. 2 supported in rotatable fashion on the axles of the tread rollers 16, so that as a result, the casting strands 22 to be severed moves under the machine 14 and between the guide rails 18 (see FIGS. 1 and 2).

Figure 2:
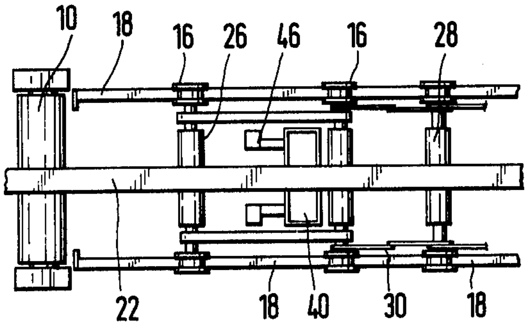
FIG. 2 is a top view of the roller conveyor utilized with the invention.

The right support roller 26 in FIGS. 1 and 2 is connected to the support rollers 28 by means of a louver type connection 30, so that these are likewise moved along with the movement of the flame cutting machine 14. As a result of this, a constant support of the casting strands 22 along the traverse path 24 (FIG. 3) is attained and namely so long until the cut off section of casting strands rests stable on the discharge roller conveyor 12.

Figure 3:
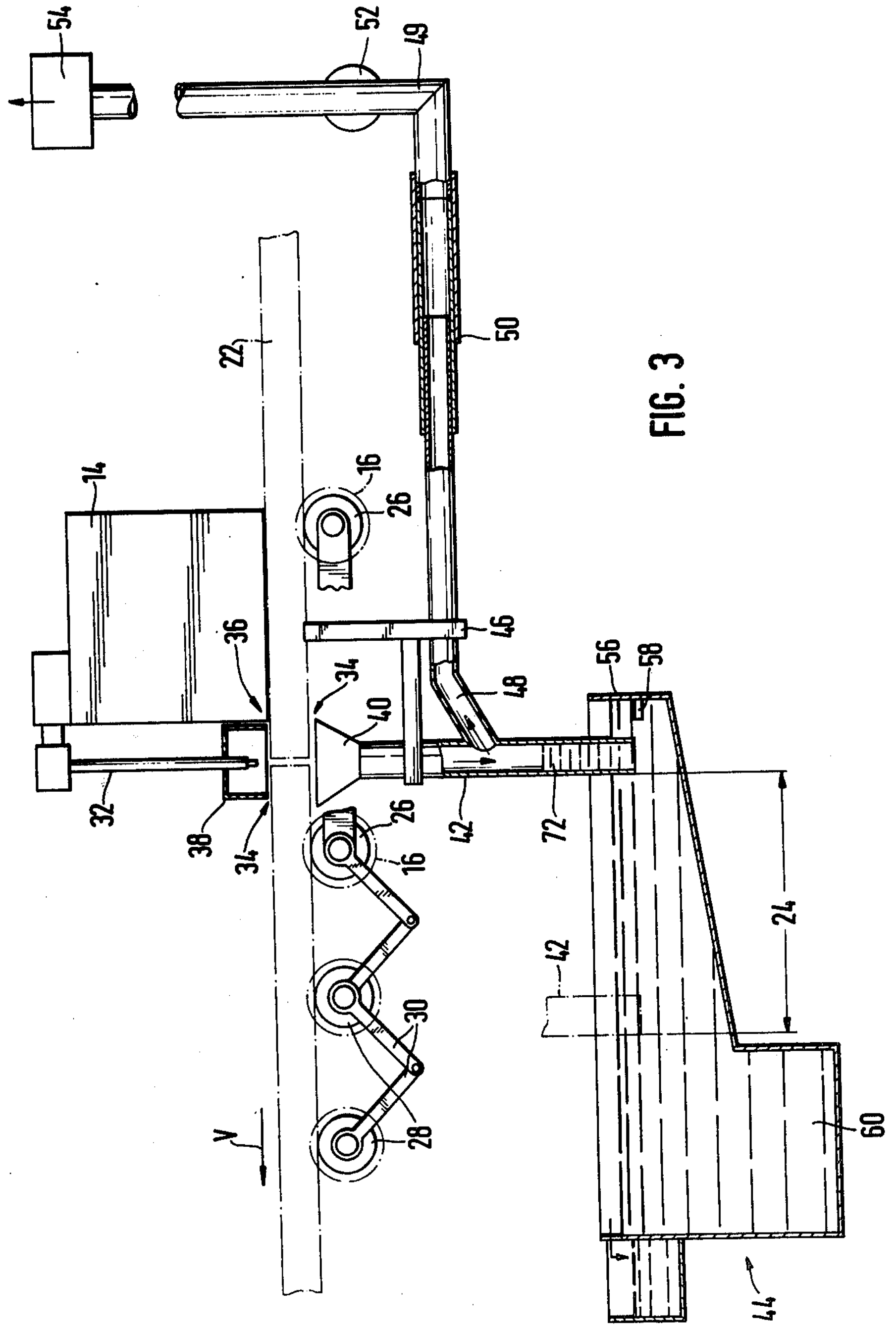
FIG. 3 is a schematic representation of the suction arrangement of the invention.

Onto the flame cutting machine 14, a cutting torch 32 is attached in a tiltable manner (see arrow P in FIG. 4) by means of which the casting strands 22 is subdivided into the proper sections. As can especially be seen in FIG. 3 a suction hood 36 is associated with the cutting zone 34. This suction hood is made up, as shown in FIGS. 1 and 3 of a protective hood 38 which is mounted about the cutting torch 32 and namely in the vicinity of its nozzle. The protective hood 38 is pot shaped, its open side oriented toward the casting strands 22.

Under the casting strands 22, but in the same plane as the tilting path of the cutting torch 32 a suction funnel 40 is provided, which together with the protective hood 38 constitutes the suction hood 36. The length (same as the height in FIG. 2) of the suction funnel 40 is so chosen that the cutting jets of the cutting torch for its entire tilting range, land into the funnel opening.

The suction funnel consists of an outlet duct 42 extending downward, which dips into a water filled settling tank 44. By means of a mounting support 46 the outlet duct 42 and with it the suction funnel 40 carred by it is connected to the flame cutting machine and moves along during the flame cutting process.

A branch duct 48 is attached to the outlet duct 42 which itself is likewise carried by the mounting support 46. The free end of the branch duct opens into a telescoping connecting piece 50. This connecting piece is connected to the fixed part of the branch duct in which a ventilator 52 is installed and which has a section 49 finally ends in a filter 54.

In the starting position of the flame cutting machine 14 it discharges with its outlet duct 42 in the right side as per FIG. 3 of the settling tank 44. Spray nozzles 58 are provided at the head wall at this location, by means of which the slag falling through the outlet duct is led in the direction of the pit 60 of the settling tank 44 in which the slag then collects.

The left position 42 of the outlet duct 42', indicated in FIG. 3 with a dottled line, illustrates the forward end position of the flame cutting machine 14, in accordance with the traverse path 24. The suction hood illustrated in FIGS. 1–3 is designed in two parts and consists, as described, of an upper protective hood 36 surrounding the cutting torch 32 and a suction funnel 40 mounted in the cutting zone 34 underneath the casting strands 22.

An additional construction of a suction hood is illustrated in FIGS. 4 and 5. This suction hood consists of a housing 62, both end faces of which exhibit passage openings 64 opposite one another through which the casting strand 22 moves. The passage openings are only slightly larger than the actual strand to be cut. It is thus also within the framework of the invention to already provide an appropriate suction hood for common casting strands cross sections which can then be mounted easily and quickly.

The housing 62 tapers downward and ends, as shown in FIGS. 4 and 3, in the outlet duct 42. The housing 62, is with the exception of both passage openings 64, a closed cavity whereby only in its top side 66 a transverse slit 68 is provided through which the cutting torch 32 extends into the housing. The length of the transverse slit 66 corresponds to the tilting path P of the cutting torch 32.

In order to prevent an escape of smoke gases and above all also an upward spraying of the slag out of the transverse slit 68, a curved plate 70 is attached to the cutting torch 32 by means of which the transverse slit 68 is constantly covered regardless of the position of the cutting torch 32.

To start the cutting process, the machine 14, its starting position at the left as shown in FIG. 1 is clamped onto the casting strands and is moved by it in the direction of the arrow V. Since the suction hood 36 is connected to the machine by means of the mounting support 46, it likewise moves along according to the speed of the cable so that the suction hood and the cutting torch are constantly in the same plane.

The slag produced during flame cutting is blown downward into the suction funnel by the kinetic energy of the cutting oxygen jet, and arrives in the settling tank 44 via the outlet duct 42, where it is then led into the pit 60 by the spray nozzles 58. The smoke gases resulting from flame cutting are sucked into the outlet duct by the ventilator 52 and flow from the outlet duct into the branch duct and through the telescoping connecting piece 50 up to the filter 54 where the smoke gases are cleansed and then released free of harmful substances into the environment.

Because of the suctioning effect of the ventilator 52, a subnormal pressure is brought about in the outlet duct 42 so that a column of water 72 results in its lower portion. The column of water prevents in an advantageous manner the suctioning of infiltrated air, so that only smoke gases are sucked by the ventilator and the latter can be of smaller performance dimensions.

Because of the direct mounting of the invention's suction hood on or about the cutting torch and thus at the cutting zone, a dampening of the often considerable noise resulting from flame cutting is advantageously attained, so that with this suction hood, aside from the optimal removal of slag and smoke gases from the cutting zone, a considerable noise reduction also results.

What is claimed is:

1. In a flame cutting machine having a cutting torch for subdividing continuously prepared casting strands with an arrangement including a suction head for removal of smoke gases, slag and the like produced during the cutting process, the improvement being said suction head and said cutting torch being mounted for joint movement together, said suction head including a housing having plurality of walls and end faces, said end faces being open to permit the casting strand to pass longitudinally through said housing, said walls of said housing defining a cutting zone therebetween, said cutting torch extending through one of said walls of said housing and into said cutting zone, and said housing surrounding said cutting zone to completely envelop the casting strand in said cutting zone.

2. In a flame cutting machine according to claim 1, characterized by the fact that said walls include an upper wall, a slit in said upper wall, and said torch extending through said slit and into said housing.

3. In a flame cutting machine according to claim 2, characterized by the fact that a cover plate is mounted to said torch, and said cover plate covering said slit.

4. In a flame cutting machine according to claim 3, characterized by the fact that an outlet duct communicates with the interior of said housing, and said outlet duct having a free end which terminates in a settling tank.

5. In a flame cutting machine according to claim 4, characterized in the fact that a branch duct is connected to and communicates with said outlet duct a ventilator being in said branch duct, and the free end of said branch duct having a filter.

6. In a flame cutting machine according to claim 5, characterized in the fact that said branch duct contains a longitudinally telescopic connecting piece whereby the length of said branch duct is adjustable.

7. In a flame cutting machine according to claim 1, characterized by the fact that an outlet duct communicates with the interior of said housing, and said outlet duct having a free end which terminates in a settling tank.

8. In a flame cutting machine according to claim 7, characterized in the fact that a branch duct is connected to and communicates with said outlet duct, a ventilator being in said branch duct, and the free end of said branch duct having a filter.

9. In a flame cutting machine according to claim 8, characterized in the fact that said branch duct contains a longitudinally telescopic connecting piece whereby the length of said branch duct is adjustable.

* * * * *